United States Patent [19]

Hudnall

[11] 3,724,150
[45] Apr. 3, 1973

[54] UNDERFLOOR ENTRANCE MEANS

[75] Inventor: Frederick W. Hudnall, Parkersburg, W. Va.

[73] Assignee: Textron Inc., Providence, R.I.

[22] Filed: Nov. 17, 1971

[21] Appl. No.: 199,624

Related U.S. Application Data

[62] Division of Ser. No. 858,906, Aug. 14, 1969, Pat. No. 3,648,559.

[52] U.S. Cl. ................................................52/221
[51] Int. Cl. ..............................................E04f 17/08
[58] Field of Search ..........52/220, 221; 174/48, 101

[56] References Cited

UNITED STATES PATENTS 2,616,142  11/1952  Tinnerman ........................85/36 X
3,478,801  11/1969  Van Niel ..........................151/41.75
3,494,084  2/1970   Hazen ................................52/221

Primary Examiner—Alfred C. Perham
Attorney—Frederick J. Olsson

[57] ABSTRACT

The combination of a fastener, tile trim or adjusting ring, cover and body of an underfloor trench, junction box, etc. The fastener rests on the tile trim or ring underneath the cover. The trim has a pair of openings. A pin secured to the body sticking up through one opening in the trim has a retaining groove flush with the trim surface. The fastener has a keyhole slot fitting in the retaining groove and also has a keeper fitting over the edge of the other trim opening. This holds the fastener.

3 Claims, 4 Drawing Figures

UNDERFLOOR ENTRANCE MEANS

This application is a division of my copending application Ser. No. 858,906 filed Aug. 14, 1969 and entitled COVER FASTENER now U.S. Pat. No. 3,648,559 issued Mar. 14, 1972.

This invention relates, in general, to electrical underfloor distribution systems.

More specifically the invention relates to improvements in means to hold down the cover and tile trim for junction boxes, trenchducts, access units and the like used in electrical underfloor distribution systems.

One object of the invention is to provide a fastening arrangement to hold down the cover of underfloor apparatus of the kind in question without use of fastening screws.

Another object of the invention is to provide a fastening arrangement to hold down, without the use of fastening screws, the cover and tile trim of underfloor apparatus of he kind in question and to continue to hold the trim in place when the cover is removed.

The elimination of fastening screws has several advantages both to the manufacturer and to the contractor or on-the-job installer.

The tile trim can be laid in and secured down in a simple and rapid manner. The cover can be placed in position in the same manner. This considerably speeds up the manufacturing process as compared to the conventional manner of securing the cover with screws.

Without screws there is no counter-sinking on either the cover or on the tile trim which is necessary when screws are used. Also the punching of access holes on components below the screws is eliminated. Furthermore, there is no necessity for forming screw retaining threads or putting on retaining nuts.

Thus, in addition to eliminating the assembly time required for threading in screws, the invention eliminates the necessary tools and labor operations for countersinking, punching and threading.

The elimination of cover hold down screws has an advantage from the standpoint of tilting or flooring contractor.

Without screws, this tile is simply laid on top of the cover. This saves much time over conventional arrangement, In the latter, the cover screws must be removed, the tiles placed on the cover so that the location of access holes in the tile can be determined and cut out, the tiles fastened down and lastly the cover screws put into place with the heads exposed on the tile surface.

The elimination of cover screws is advantageous from the aesthetic standpoint. For example, a typical 9-foot length of trenchduct (which is the standard size) includes nine screws along one side and nine screws along the other side. All of the screw heads are visible when the trench is installed. Ordinarily an installation will encompass several standard lengths and thus create a long line of screw heads. The elimination of this effect gives a much more satisfactory and pleasing appearance.

A preferred embodiment of the invention will be described below in connection with the following drawings wherein.

Figure 4:
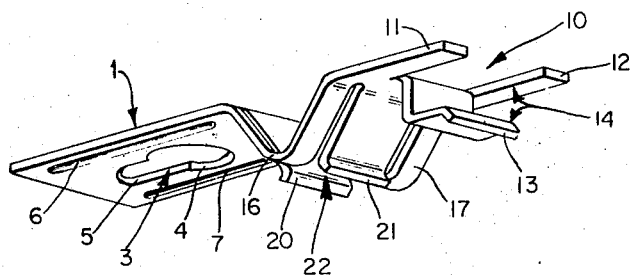
FIG. 4 is a perspective view of the fastener of the invention.

Referring to FIG. 4 the fastener 1 includes the rectangular shaped, generally flat, elongated body 2. A keyhole slot 3 is formed adjacent one edge of the body. The keyhole slot has an enlarged section 4 and narrow section 5. On either side of the keyhole slot 3 are dimpled sections 6 and 7 which provide strengthening ribs in the body.

On the right hand side there is a lanced section which forms a pair of tabs 11 and 12 extending away from the body. A third tab 13 is formed between the pair 11 and 12 and extends outwardly in same direction. The tabs 11 and 12 and tab 13 form a retaining groove 14.

In the middle of the body, between the keyhole slot 3 and the groove 14, there is an open dimpled section 15 formed as by a pair of spanner sections 16 and 17 and a pair of arms 20 and 21 which extend down from the body and are spaced from one another to provide an opening 22.

Preferably, the fastener is made from heat treated spring steel to make a tough, high strength device with certain resiliency in the arms 20 and 21 and in the tab 13 for reasons which will be apparent as the description proceeds.

The manner in which the fastener is applied to a typical trench or junction box structure will be described in connection with FIG. 1.

A typical trench or junction box includes a hollow body or housing for retaining electrical cable. In FIG. 1, such a body or housing is indicated at 23. The trench or junction box also includes a cover which extends at least partially over the body and seals off the interior. The cover, of course, when removed provides an entrance or an access opening to the interior of the body. In FIG. 1 a typical cover is indicated at 24.

The usual trenchduct and junction box also incorporates a structure commonly called tile trim which is disposed between the body and the cover and in the usual structure serves as a support means for the cover. The title trim extends up along the peripheral edge and projects above the surface of the cover to protect the edges of tile 28 mounted on the cover when the cover is removed. Ordinarily the tile trim is mounted on adjusting screws which provide for motion in a vertical direction so that the trim and cover can be moved up and down for purposes of leveling the cover with the floor. A tile trim of the kind described is indicated at 25 in FIG. 1.

Figure 1:
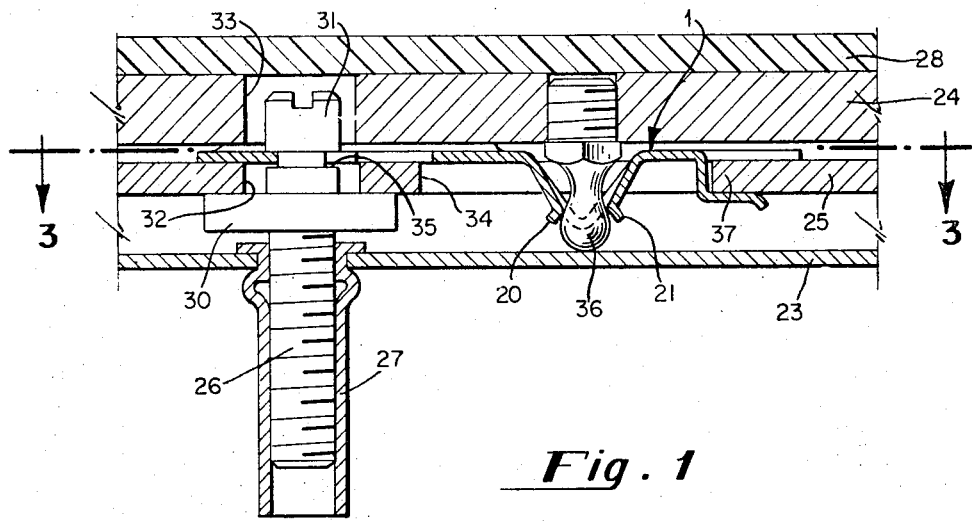
FIG. 1 is a fragmentary sectional elevational view of conventional trench or junction box structure wherein the invention is incorporated.

In FIG. 1, a typical adjusting screw is indicated at 26, the screw being mounted on a nut 27 attached to the body 23. The screw carries a ledge 30 which supports the tile trim. The screw has a head 31 which extends up through the circular aperture 32 in the tile trim and through the circular aperture 33 in the cover.

In a typical junction box there is usually one adjusting screw in each corner and in a trench there are ordinarily three adjusting screws respectively on each side of cover. The screw is adjustable as by a screw driver or the like twisted in the head 31.

For purposes of incorporating the invention in a trench or junction box the tile trim is provided with an aperture 34 and the screw is provided with a retaining slot 35 the functions of which will be presently described. The cover is also modified as by being provided with a ball stud 36 whose function will also be described shortly.

Referring to FIG. 1, assume that the cover 24 and fastener 1 have been removed.

First the fastener 1 is laid down on the tile trim 25 with dimple section 15 extending into the aperture 34 and with the head 31 of the screw fitting into the enlarged portion 4 of keyhole slot 3. The fastener is then slid over to the right so that the narrow slot 5 fits into the retaining slot 35 on the screw and the groove 14 of the fastener fits over the edge of 37 of the tile trim which forms part of the aperture 34.

The tab 13 of the fastener is shaped such that when it is engaged with the edge 37 of the trim it exerts a pressure thereon for the purpose of holding the fastener firm in position. The edge 37 is in effect a retaining tongue fitting into a groove 14. It will be apparent that the interlocking of the slots 5 and 35 will prevent upward motion of the fastener in a direction generally normal to the plane of the fastener and that the tongue 37 also prevents such upward motion of the fastener.

Now then, the cover is moved back into place so that the ball stud 36 moves down between the arms 20 and 21 into the position as shown. The arms 20 and 21 exert pressure on the stud so as to secure the same in position. The force developed is sufficient to maintain the cover down on the tile trim under normal usage.

Thus, in a junction box with a fastener at each corner the cover will be securely held in position. Also in a trench duct with one or more fasteners along each side of the cover the same will be securely locked in. In either instance, of course, the cover can be removed. For removal purposes, the cover is preferably provided with one or more threaded holes into which can be inserted a tool or an eye and the cover lifted off.

With reference to FIG. 1 it will be observed that when the cover is removed the fastener device 1 operates to maintain the tile trim in position. This is a special feature of the invention. Holding the tile trim firm in position when the cover is removed is highly desirable as otherwise there is a very real danger that the trim will be moved and cause damage to the floor tile. Furthermore, full advantage is taken of the no-screw concept.

Before going on it is pointed out that with the cover removed the fastener can be taken out of the position shown simply by sliding to the left and lifting upwardly. With the fastener removed the tile trim can be taken off the adjusting screws.

Figure 2:
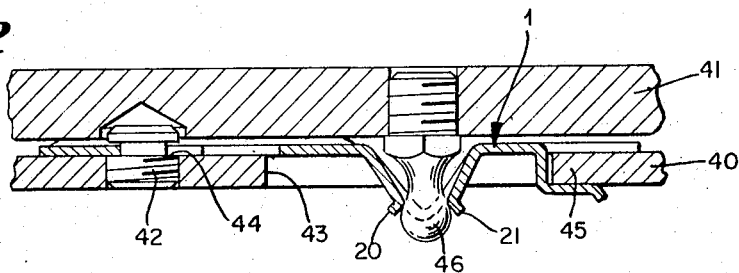
FIG. 2 is a fragmentary sectional elevational view of a conventional access unit structure having the invention incorporated therein.
Figure 3:
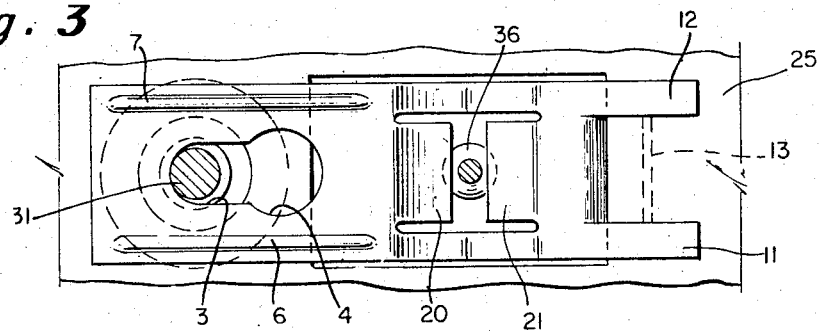
FIG. 3 is a view taken along lines 3—3 of FIG. 1.

FIG. 2 shows the manner in which the invention is applied to an adjustable ring type junction box or access unit and to a non-adjustable trenchduct.

In FIG. 2, the part 40 represents an adjusting ring of a junction box or of an access unit or the body of a non-adjustable trenchduct. The ring is supported on adjusting screws mounted on the body or housing containing electrical cables. The cover of such a device is represented at 41. The details of construction of such devices are well known to those skilled in the art and need not be described. To incorporate the invention in the foregoing devices, the adjusting ring of the junction box or access unit or the body of the trench is provided with a head member 42 and an aperture 43. The head member 42 has a retaining slot 44 which serves the same function as the retaining slot 35 of FIG. 1. The edge 45 of the body forms a tongue similarly as the edge 37 in FIG. 1. The cover 41 has a ball stud 46 the same as the ball stud 36.

The fastener 1 is positioned on the body 40 with the retaining slot 5 interfitting with the retaining slot 44, with the groove 14 accepting the tongue 45 and with the ball stud 46 being held between the arms 20 and 21. The cover 41 is secured in place.

We claim:

1. In an electrical underfloor distribution system:
a hollow housing for retaining electrical cables;
a cover extending at least partially over said hollow housing, the cover when removed providing an access opening to the housing interior;
tile trim means extending at least partially along the peripheral edge of said cover;
first and second apertures formed in said tile trim;
an adjusting screw mounted on said housing and extending into said first aperture;
a ledge formed on said adjusting screw and supporting the said tile trim;
a retaining slot formed on said screw between said tile trim and said cover;
a fastener for securing said cover and said tile trim on said hollow housing, the fastener comprising a generally flat, elongated body resting on top of the tile trim and being formed with a keyhole slot oriented so that its larger portion is inboard of one edge of the body and its smaller portion is located between the larger portion and said one edge with at least part of the smaller portion being disposed within said retaining slot and the body having means on the opposite edge forming a groove within which is disposed part of the tile trim of said second aperture and the body also being formed with a pair of retaining arms extending down from the body through said second aperture and the body further being formed with a pair of sections extending along the body respectively on opposite sides of said keyhole slot and providing strengthening ribs for the body; and
a ball stud on said cover and extending between said arms, the arms exerting pressure on the stud to retain the same in position.

2. In an electrical underfloor distribution system:
a hollow housing for retaining electrical cables;
a cover extending at least partially over said hollow housing, the cover when removed providing an access opening to the housing interior;
tile trim means connected to said housing and extending at least partially along the peripheral edge of said cover;
first and second apertures formed in said tile trim;
a head mounted on said housing and extending into said first aperture;
a retaining slot formed on said head between said tile trim and said cover;
a fastener for securing said cover and said tile trim on said housing, the fastener comprising a generally flat, elongated body resting on top of the tile trim and being formed with a keyhole slot oriented so that its larger portion is inboard of one edge of the body and its smaller portion is located between the larger portion and said one edge with at least part of the smaller portion being disposed within said retaining slot and the body having means on the opposite edge forming a groove within which is disposed part of the tile trim of said second aperture and the body also being formed with a pair of retaining arms extending down from the body through said second aperture and the body further being formed with a pair of sections extending along the body respectively on opposite sides of said keyhole slot and providing strengthening ribs for the body; and a ball stud on said cover and extending between said arms, the arms exerting pressure on the stud to retain the same in position.

3. In an electrical underfloor distribution system:

a hollow housing for retaining electrical cables;

a ring mounted on said housing;

a cover mounted on said ring and extending at least partially over said hollow housing, the cover when removed providing an access opening to the housing interior;

an aperture formed in said ring;

a head mounted on said ring;

a retaining slot formed on said head below said cover;

a fastener for securing said cover on said ring, the fastener comprising a generally flat elongated body resting on said ring and being formed with a keyhole slot oriented so that its larger portion is inboard of one edge of the body and its smaller portion is located between the larger portion and said one edge with at least part of the smaller portion being disposed within said retaining slot and the body having means on the opposite edge forming a groove within which is disposed part of said ring aperture and the body also being formed with a pair of retaining arms extending down from the body through said ring aperture and the body further being formed with a pair of sections extending along the body respectively on opposite sides of said keyhole slot and providing strengthening ribs for the body; and a ball stud on said cover and extending between said arms, the arms exerting pressure on the stud to retain the same in position.

* * * * *